(12) United States Patent
Axnäs et al.

(10) Patent No.: US 8,023,938 B2
(45) Date of Patent: Sep. 20, 2011

(54) CO-SEQUENCE INTERFERENCE DETECTION AND TREATMENT

(75) Inventors: Johan Axnäs, Solna (SE); Magnus Olsson, Uppsala (SE); Dennis Hui, Cary, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1040 days.

(21) Appl. No.: 11/628,460

(22) PCT Filed: Jun. 18, 2004

(86) PCT No.: PCT/SE2004/000991
§ 371 (c)(1), (2), (4) Date: Sep. 14, 2007

(87) PCT Pub. No.: WO2005/125036
PCT Pub. Date: Dec. 29, 2005

(65) Prior Publication Data
US 2008/0274727 A1    Nov. 6, 2008

(51) Int. Cl.
*H04W 24/00* (2009.01)

(52) U.S. Cl. .............. 455/423; 455/63.1; 455/67.11; 455/446; 455/502; 455/524; 455/550.1; 455/226.1; 455/561; 375/349; 375/264; 375/267; 375/346; 375/260; 370/335; 370/342; 370/441; 370/337; 370/347

(58) Field of Classification Search ............ 455/423, 455/63.1, 67.11, 446, 502, 524, 550.1, 226.1, 455/561; 375/349, 264, 267, 346, 343, 260; 370/335, 342, 441, 337, 347
See application file for complete search history.

(56) References Cited

U.S. PATENT DOCUMENTS

| | | | |
|---|---|---|---|
| 5,995,499 A * | 11/1999 | Hottinen et al. | 370/337 |
| 6,298,095 B1 | 10/2001 | Kronestedt et al. | |
| 6,349,207 B1 | 2/2002 | Monot et al. | 455/423 |
| 7,062,294 B1 * | 6/2006 | Rogard et al. | 455/562.1 |
| 2002/0159547 A1 * | 10/2002 | Lindoff et al. | 375/343 |
| 2003/0026223 A1 | 2/2003 | Eriksson et al. | |

FOREIGN PATENT DOCUMENTS

| | | |
|---|---|---|
| WO | 98/59443 | 12/1998 |
| WO | WO 99/30523 | 6/1999 |

OTHER PUBLICATIONS

Karlsson et al., "Interference Rejection Combining for GSM", Proc. Of the 5th IEEE International Conference on Universal Personal Communications, 1996, vol. 1, pp. 433.437.

(Continued)

*Primary Examiner* — Kwasi Karikari
(74) *Attorney, Agent, or Firm* — Nixon & Vanderhye P.C.

(57) ABSTRACT

Signal properties of a signal section (106) comprising a training sequence are compared with corresponding signal properties of other signal sections (108, 110). At a too large discrepancy, co-sequence interference is concluded to be present. The used signal property can preferably be a signal-to-noise ratio measure or a signal statistics measure. If the existence of co-sequence interference (102) is concluded, measures can be taken to avoid such interference and to mitigate the effects of the interference. A method for mitigating effects of co-sequence interference in channel estimation comprises a joint detection and estimation procedure performed under constrictions assuming presence of co-sequence interference.

25 Claims, 6 Drawing Sheets

OTHER PUBLICATIONS

Bladsjö, "Interference Cancellation Using Antenna Diversity for EDGE—Enhanced Data Rates in GSM and TDMA/136", Proc. Of the 50$^{th}$ IEEE Vehicular Technology Conference, fall 1999, vol. 4, pp. 1956-1960.

Haykin, "Adaptive Filter Theory", 3$^{rd}$ Edition, Prentice Hall, New Jersey, U.S.A., 1996, pp. 365-438, 562-587.

Viswanathan et al., "Space-Time Signaling for High Data Rates in EDGE", IEEE Transactions on Vehicular Technology, vol. 51, No. 6, Nov. 2002, pp. 1522-1533.

International Search Report of PCT/SE2004/000991, mailed Feb. 8, 2005.

* cited by examiner

CO-SEQUENCE INTERFERENCE DETECTION AND TREATMENT

This application is the US national phase of international application PCT/SE2004/000991, filed 18 Jun. 2004, which designated the U.S., the entire content of which is hereby incorporated by reference.

TECHNICAL FIELD

The present invention relates in general to radio interference conditions in mobile communications systems and in particular to detection and treatment of so-called co-sequence interference.

BACKGROUND

The capacity of mobile communications systems is typically limited by the amount of available radio resources. The radio resources can be defined as units in a resource space spanned by e.g. time, frequency and/or codes. The total capacity of a communications system may be increased by letting geographically well separated nodes use the same radio resources, a so-called reuse of resources. However, in order to avoid interference between nodes using the same radio resources, the geographical distance (or distance defined by radio conditions) between the nodes has to be relatively large. Any co-channel interference between the two users of the same radio resource should not substantially degrade quality and performance in either of the cells. In the present disclosure, the term "co-channel interference" refers to interference caused by nodes utilising the same radio resources, in a general case determined in terms of e.g. frequency, time and/or code. However, smaller amounts of co-channel interference may be tolerated depending on the amount of sophistication of signal processing at the receivers, e.g. in terms of coding, diversity, interleaving etc. The more co-channel interference receivers can tolerate, the more system operators can decrease the reuse distance and thereby increase the total capacity.

A radio signal is distorted when it is transmitted over the air. The received signal therefore differs somewhat in amplitude and/or phase compared with the originally transmitted one. This is basically due to path loss due to the traveled distance, shadowing effects and multipath fading. In order to correctly decode the transmitted data, model parameters of the signal distortion are estimated. One approach that often is used is to incorporate a known symbol sequence into the transmitted signal. Such known symbol sequence is known under different names, such as "training sequence", "learning sequence", "training bits", "pilot sequence" etc. In the present disclosure, the term "training sequence" will be used for characterising all types of transmitted data, the content of which is pre-known by the receiver, and which is used to identify and characterise the received signals, e.g. for synchronisation and channel estimation.

The training sequence has typically a double purpose. One purpose is to provide means for achieving reliable channel estimations. Another purpose is to provide means for the receiver to distinguish between co-channel signals originated from different transmitters. The different training sequences have preferably a low cross-correlation, i.e. the sum of products of corresponding symbols of two training sequences should be close to zero at all relative time shifts. At the same time, the auto-correlation should be such that a high correlation is achieved for a zero bit shift, while a low correlation is achieved for any other bit shifts. This means that the number of useful training sequences is severely limited and a set of training sequences with good cross-correlation and auto-correlation properties is often difficult if not impossible to find. In GSM, a 26 bits long training sequence is used in a normal burst. Totally 8 different training sequences are available within the GSM specifications. All of these training sequences have very good auto-correlation properties, but some of them have unfortunately relatively high cross-correlation among each other.

If two signals are transmitted using the same radio resource, but with different training sequences, a receiver can use the training sequence to distinguish between the signals during the estimation procedures. The influence from an interfering co-channel signal having a different training sequence can thus be fairly well mitigated. However, if both signals also use the same training sequence, the receiver will interpret the total signal as coming from one and the same transmitter. This will result in erroneous channel estimation, inadequate path loss determinations, incorrect directional determinations etc. In the present disclosure, we refer to this kind of co-channel interfering signals, which use training sequences that have substantially high cross-correlations with the training sequence used by the desired signal, as "co-sequence interference". The term "co-sequence interference" thus in a general case comprises not only interference between signals utilising identical training sequences, but also interference between signals having training sequences that significantly influences the interpretation of the desired signal due to high cross-correlation.

In the published international patent application WO 98/59443 it is concluded that if two signals arrive at a receiver at almost the same time, and their training sequences are the same, there is, in conventional receivers, no way to distinguish the contribution from each of them to the received signal. Instead of mitigating the effects of such interference, the disclosure presents a method for preventing or reducing the risk of the interference to appear by introducing time offsets between radio base stations using the same resources. Similar preventing ideas are also disclosed in the published international patent application WO 98/59443. A problem with such a solution is that it becomes more difficult to provide efficient radio network planning and to achieve maximum gain from e.g. interference suppression techniques if bursts within a system are not time-aligned.

Also in the published U.S. patent application US 2003/0026223, the existence of the co-sequence interference is discussed. In this disclosure, the interference is not directly detected or compensated for. Instead, the effects of any possible co-sequence interference are reduced by introducing training sequence hopping for all connections, whereby the continuous time interval during which any possible co-sequence interference exists is reduced.

SUMMARY

A general problem with devices, systems and methods according to prior art is that there are no procedures available for detecting any existence of co-sequence interference. A further problem of prior art systems is that, since the occurrence of co-sequence interference has not been able to determine, there are no methods for treating, compensating or mitigating effects resulting directly or indirectly from co-sequence interference, and in particular effects on channel estimation.

It is thus a general object of the present invention to provide methods and devices for detection of co-sequence interference. It is also an object of the present invention to provide methods for avoiding co-sequence interference. It is a further object to provide devices and methods for mitigating the direct or indirect effects resulting from co-sequence interference.

The above objects are achieved by devices and methods according to the enclosed patent claims. In general words, signal properties of a signal section comprising a training sequence are compared with corresponding signal properties of other signal sections. When there is a large discrepancy, co-sequence interference is concluded to be present. The used signal property can preferably be a Signal-to-Noise Ratio (SNR) measure or a signal statistics measure. If the existence of co-sequence interference is concluded, measures can be taken to avoid such interference and/or to mitigate the effects of the interference. A method for mitigating effects of co-sequence interference in channel estimation comprises a joint detection and estimation procedure performed under constrictions assuming the presence of co-sequence interference. A preferred embodiment comprises per-survivor channel tracking.

One very important advantage with the present invention is that co-sequence interference for the first time is possible to detect and mitigate.

BRIEF DESCRIPTION OF THE DRAWINGS

The invention, together with further objects and advantages thereof, may best be understood by making reference to the following description taken together with the accompanying drawings, in which.

DETAILED DESCRIPTION

Figure 1:
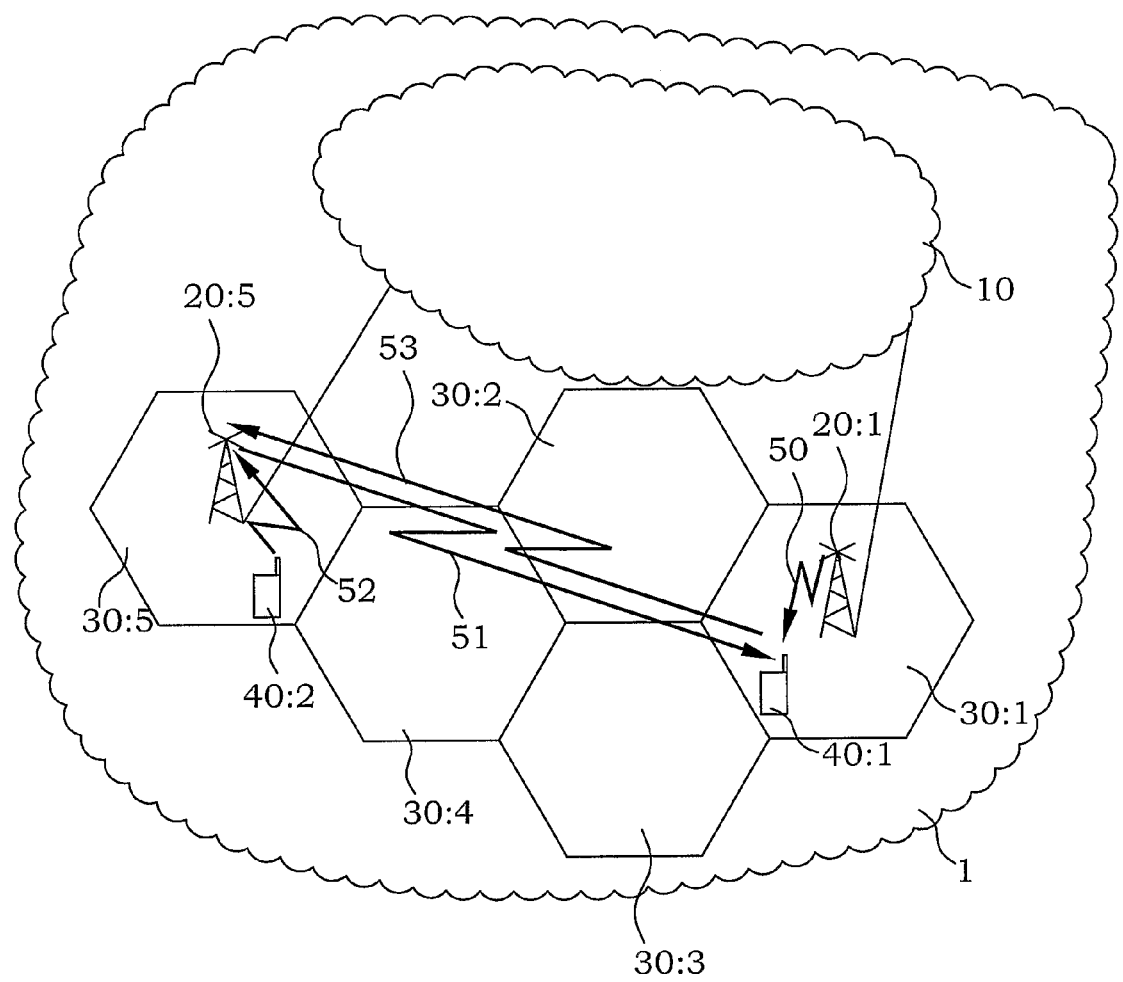
FIG. 1 is a schematic illustration of co-sequence interference in a mobile communications system.

FIG. 1 illustrates a general mobile communications system 1, comprising a network 10 and a number of connected base stations 20:1, 20:5 (of which only two are illustrated). The network 10 comprises in a typical case a core network and at least parts of a radio access network. Each base station 20:1, 20:5 is associated with a cell 30:1-30:5, in which the base station 20:1, 20:5 is responsible for the coverage. A number of mobile stations 40:1, 40:2, of which only two are illustrated, are present within the coverage of the cells 30:1-30:5. In the communications system, some type of reuse plan is typically applied, dividing the use of available radio resources between the different cells. In the illustrated system, it is assumed that all cells 30:1 to 30:4 have exclusive sets of available resources, typically radio channels, while cells 30:1 and 30:5 have identical sets. Communication within cells 30:1 and 30:5 may therefore cause co-channel interference with each other.

Further assume that both illustrated mobile stations 40:1, 40:2 are allocated to the same radio resource and furthermore assigned to the same training sequence or training sequences having a substantial cross-correlation. In such a situation, a downlink signal 50 from base station 20:1 to mobile station 40:1 will experience co-sequence interference from a downlink signal 51 intended for communication between the base station 20:5 to mobile station 40:2. The same situation is also present at mobile station 40:2. Also, an uplink signal 52 from mobile station 40:2 to base station 20:5 will be influenced by co-sequence interference from an uplink signal 53 intended for communication between the base station 20:1 to mobile station 40:1. The same situation is also present at base station 20:1.

A main idea of the present invention is detection of the presence of co-sequence interference. Such detection can according to the present invention be achieved by comparing properties of the received signal during training sequence and the corresponding properties during the burst payload. A signal is received in a receiver. The receiver could be comprised in a mobile station or in a base station. The signal is assumed to comprise at least two signal sections, one section comprising a training sequence, and one section comprising burst payload. The section comprising the training sequence could be situated in the beginning, the end or in the middle of the signal burst, representing preamble training sequence, postamble training sequence and midamble training sequence, respectively. In the following description, a mid-amble training sequence will be used as a model system, but the present invention is also applicable on other training sequence configurations as well. Also training sequences divided in more than one part can be used with the present invention.

A certain property, e.g. signal statistics or an SNR measure is evaluated for the section comprising the training sequence. The same property is then evaluated for a section not involving the training sequence. A comparison between the evaluated values of the property for the two sections can then be used for detecting any existence of significant co-sequence interference.

Figure 2A:
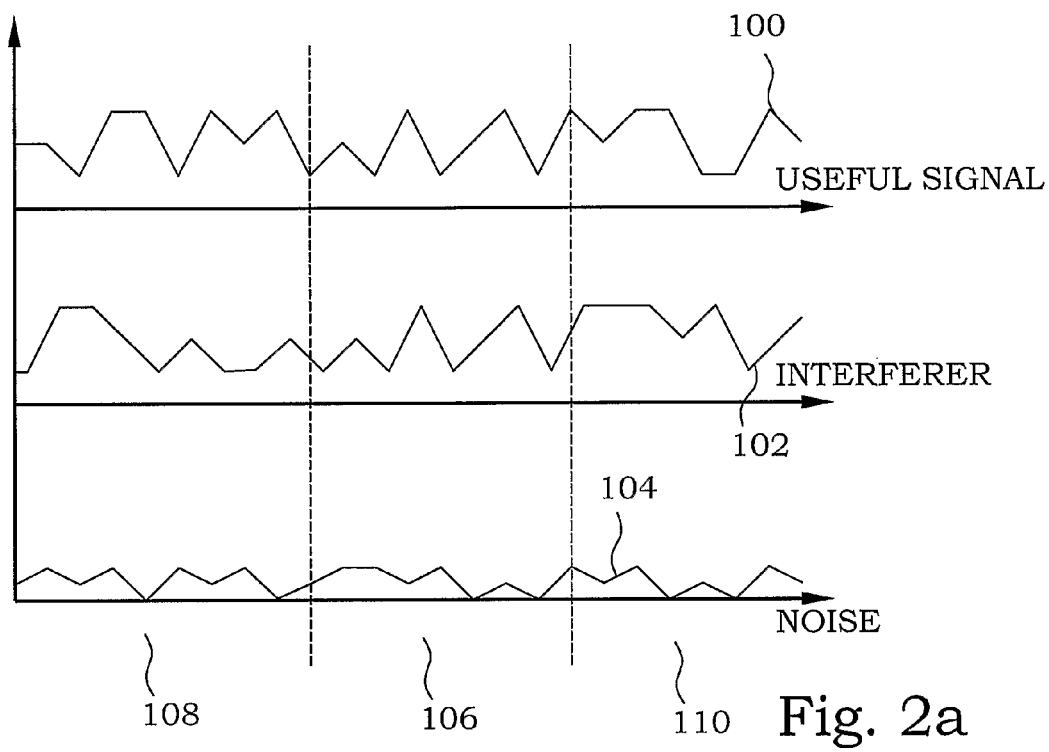
FIG. 2a-c are diagrams illustrating model signals involving training sequences and how co-sequence interference affects signal properties.
Figure 2B:
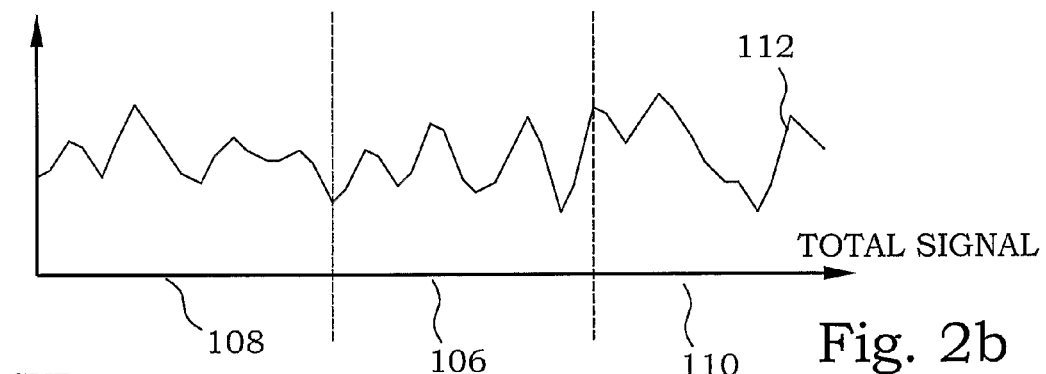
Figure 2C:
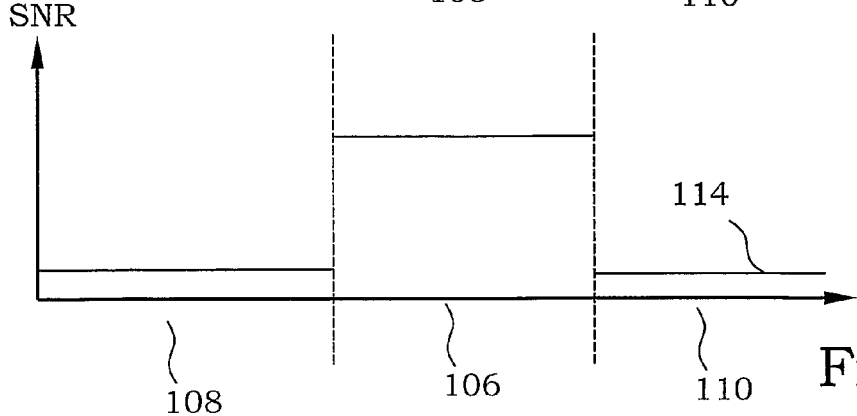

FIGS. 2a-c may assist in understanding the basic ideas. In FIG. 2a, three signals are schematically illustrated. Notice that the illustrated signals are not intended to be illustrations of true signals, but their shapes and intensities are selected in order to explain the basic ideas of the present detection method. In the upper part, a useful signal 100 is illustrated, having a midamble training sequence section 106 surrounded by two payload signal sections 108, 110. A second illustrated signal 102 represents a co-sequence interference signal. This signal is more or less identical to the useful signal within the training sequence section 106, disregarding fading due to differing travel paths. Such differences are illustrated as a small shift in the signal. However, the interference signal 102 comprises different payload data, and consequently, the interference signal 102 becomes essentially uncorrelated with the useful signal 100 in the payload sections 108, 110. A noise signal 104 is also illustrated, contributing with essentially the same content in all sections 106, 108, 110.

FIG. 2b illustrates a total received signal 112, which basically is a sum of the signals in FIG. 2a, with certain intensity weights. One can see that the structure in the training sequence section 106 still is rather intact compared with the useful signal 100, but that the payload signal sections 108, 110 differ significantly. When using the training sequence section for channel estimation, the differences between the useful signal 100 and the total signal 112 will just be interpreted in terms of propagation path conditions. A relatively high amplitude is detected, which will be interpreted as good propagation conditions and may even lead to subsequent reduction in transmission power if power control functionality is applied. Moreover, the interference signal contribution in the training sequence section will also be reflected in the channel estimation. This results in that, when a subsequent decoding of the payload sections is performed, the decoding quality will be low.

According to the present invention, signal properties are evaluated in the different signal sections and compared. In a typical receiver, there are two main stages in receiving a burst; channel estimation stage and equalisation stage. During the channel estimation stage, the known training sequence is used to estimate the channel of the desired signal. By convolving the channel estimate with the known transmitted training sequence, one obtains the desired part of the received signal. This desired part can be subtracted from the total received signal, which ideally leaves only noise and/or any interfering signal. The power of the noise and/or interfering signal may then easily be calculated as the sum of the squared magnitude of the noise and/or interference signal over the training sequence. Similarly, the power of the desired signal can be obtained e.g. as the sum of the squared magnitude of itself. Together, these power measures gives a first estimate of the SNR.

During the equalization stage, the most likely data symbol sequence is estimated with the aid of the channel and noise estimates obtained during the channel estimation stage. The so determined data symbol sequence can then be utilized to estimate a second SNR. By convolving the channel estimate with the most likely data symbol sequence, one obtains the desired signal part of the received signal. This part can be subtracted from the total received signal during the data parts of the burst, which ideally leaves only noise and/or any interfering signal. Again, the power of noise and/or interfering signal as well as of desired signal may be calculated in the same way as for the channel estimation stage, and the second estimate of the SNR can be obtained.

If the desired and interfering signals have uncorrelated training sequences, the SNR's of the different parts will substantially be of the same size. If, however, the training sequences of the desired and interfering signals are the same or have substantial cross-correlation, then all or most of the interfering signal during the training sequence will be interpreted as part of the desired signal, giving rise to an overestimation of the SNR. During the data part of the burst, on the other hand, the desired and interfering signals will be different. Nothing or just a smaller part of the interfering signal will be interpreted as desired signal, thus giving a lower SNR estimate. This difference in SNR estimates will thus be an indication of high correlation between the training sequences of desired and interfering signals. FIG. 2c illustrates the results of an evaluation of an SNR measure 114 for the signal within the different signal sections. In the training sequence section 106, the SNR measure has a high value, since the sum of the interfering signal 102 and the useful signal 100 is regarded as "signal" and only the noise signal 104 is regarded as "noise". However, in the payload sections 108, 110, the interference signal 102 mainly contributes to the "noise" instead, whereby the SNR measure is significantly reduced. A comparison of the SNR measures between the training sequence section 106 and any of the payload sections 108, 110 will reveal the existence of any co-sequence interference.

In FIG. 2c, a SNR evaluation has been used. However, also other signal properties can be utilised in order to discover any differences. One alternative embodiment uses signal statistics. A statistical correlation value $\eta_{m,n}^T(\tau)$ is achieved over the training sequence section as:

$$\eta_{m,n}^T(\tau) = \frac{1}{N_T - L + 1} \sum_{t=t_T+L-1}^{t_T+N_T-1} r^m(t) r^n(t-\tau),$$

for $\tau = 0, 1, \ldots, \tau_{max}$, where $t_T$ denotes the time index at the start of the training period, $N_T$ denotes the length of the training sequence, and L denotes the length of the channel response. A corresponding value is evaluated for each of the payload sections:

First payload section $$\eta_{m,n}^{P1}(\tau) = \frac{1}{N_{P1} - L + 1} \sum_{t=t_{P1}+L-1}^{t_{P1}+N_{P1}-1} r^m(t) r^n(t-\tau)$$

Second payload section $$\eta_{m,n}^{P2}(\tau) = \frac{1}{N_{P2} - L + 1} \sum_{t=t_{P2}+L-1}^{t_{P2}+N_{P2}-1} r^m(t) r^n(t-\tau)$$

where $t_{P1}$ and $t_{P2}$ denotes the time index at the start of the first and second periods, respectively, $N_{P1}$ and $N_{P2}$ denotes the length of the first and second payload periods, respectively, and L denotes the length of the channel response. An overall payload measure then becomes:

$$\eta_{m,n}^P(\tau) = \frac{\eta_{m,n}^{P1}(\tau) + \eta_{m,n}^{P2}(\tau)}{2}.$$

A possible criterion for declaring existence of co-sequence interference could then be:

$$|\|\eta_{m,n}^P\| - \|\eta_{m,n}^T\|| > \gamma,$$

where $\|\cdot\|$ denotes squared norm of a function, and $\gamma$ denotes a predefined threshold. In other words, if the size of a difference between property values evaluated in the different sections exceeds a predetermined threshold, one may assume that the received signal is affected by co-sequence interference. The cause of such a difference stems from the fact that the respective symbols transmitted by the desired user and the interferer are identical (or highly correlated) over the training sequence while they are uncorrelated over the payload section of the burst.

It is also possible to use a relative measure as interference criterion, e.g.:

$$\frac{|\|\eta_{m,n}^P\| - \|\eta_{m,n}^T\||}{\|\eta_{m,n}^P\|} > \gamma.$$

The above relations are expressed in a relatively general manner. The parameters m and n can in principle be selected arbitrarily. When m and n are set equal to 1, $\eta_{1,1}^{P}(\tau)$ and $\eta_{1,1}^{T}(\tau)$ are simply autocorrelation functions estimated over the different sections.

Figure 3:
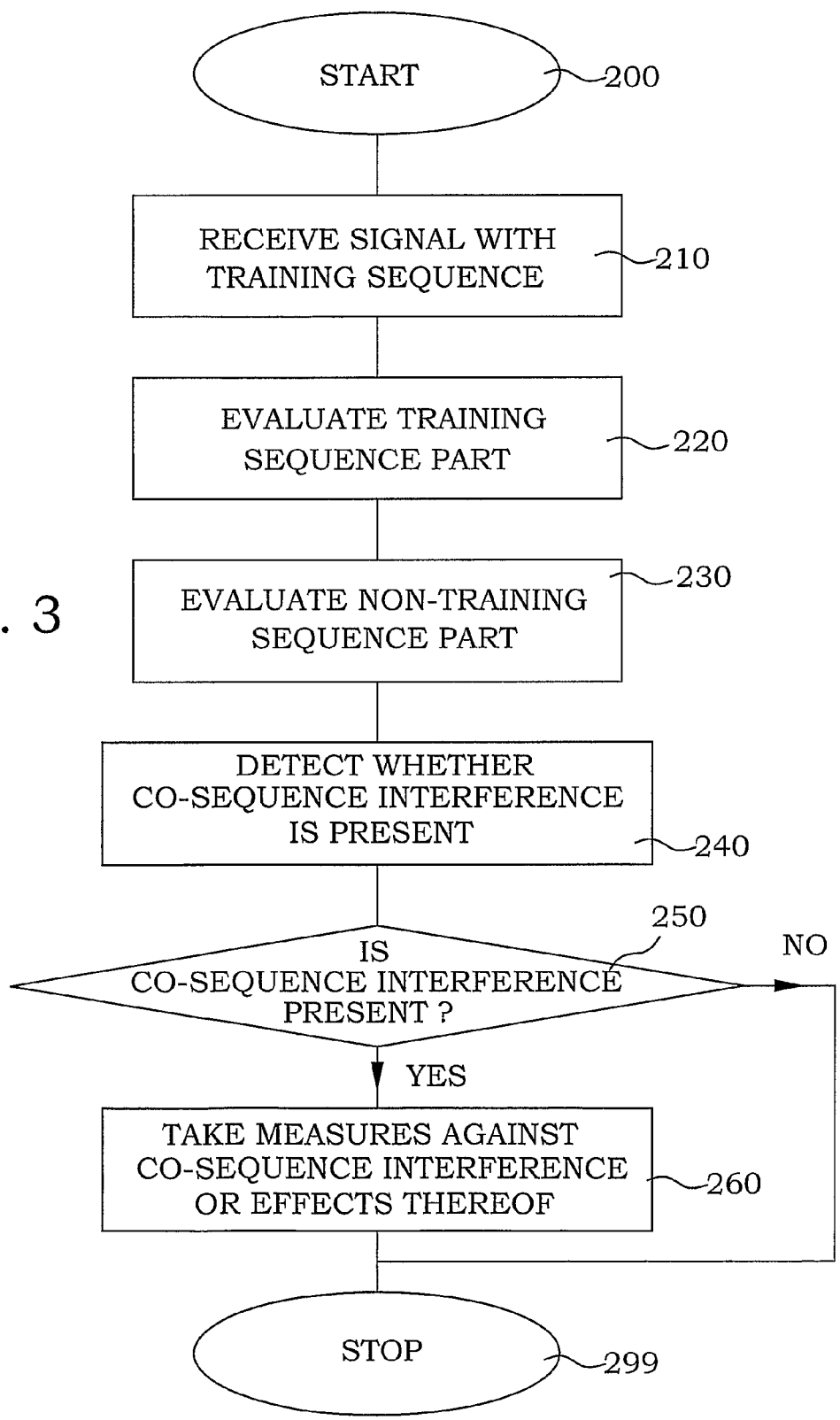
FIG. 3 is a flow diagram of the main steps of an embodiment of a method according to the present invention.

The main steps of an embodiment of a method according to the present invention are illustrated in FIG. 3 as a flow diagram. The procedure starts in step 200. In step 210 a signal is received, which comprises both training sequence and other data. An evaluation of a property of the received signal over a signal section comprising training sequence data is made in step 220. Non-exclusive examples of such properties are SNR and signal statistics properties, as discussed more in detail above. In step 230, a similar evaluation is performed over another signal section of the received signal. A detection of the existence of co-sequence interference, if any, is performed in step 240, based on a comparison between values of the properties evaluated in steps 220 and 230. Preferably, an absolute or relative difference between the values, is compared with a predetermined threshold value. In step 250, it is checked if co-sequence interference is detected in step 240, and if it is, the procedure continues with step 260, otherwise the procedure is ended in step 299. In step 260, different measures are taken, in order to remove the interference itself, to remove effects that the interference may cause or just to mitigate the interference effects. Such measures are discussed more in detail further below. The procedure ends in step 299.

Figure 4:
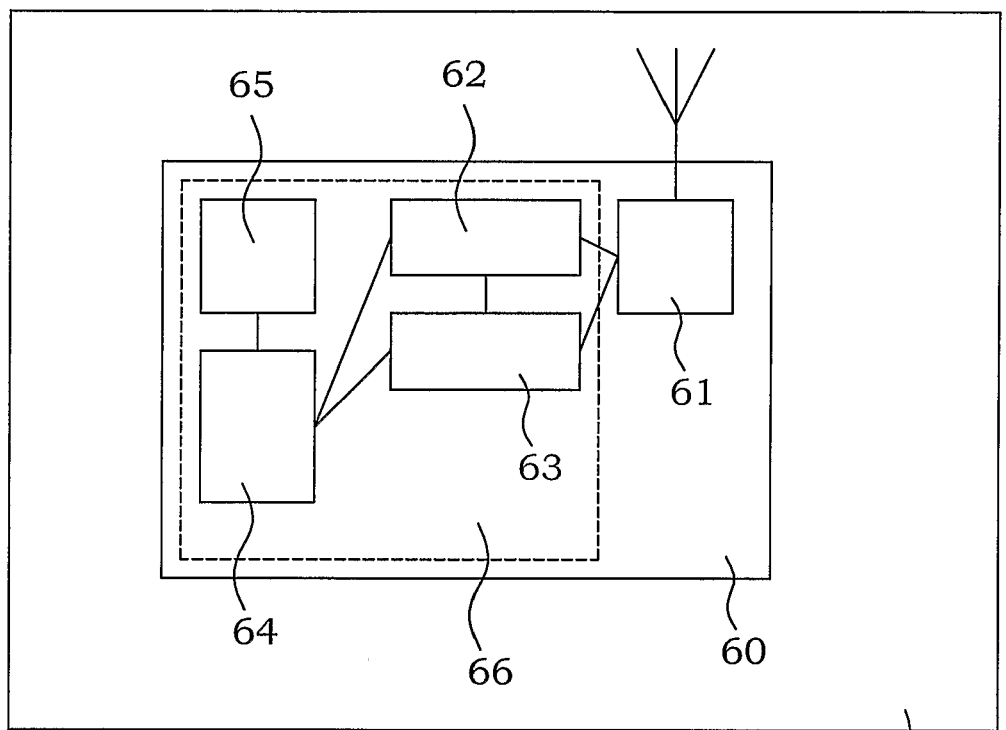
FIG. 4 is a block diagram of an embodiment of a base station according to the present invention.

The above procedure takes typically place in or in direct connection with a receiver. In FIG. 4, an embodiment of a base station 20 according to the present invention is illustrated as a block scheme. The base station 20 comprises a receiver 60. The receiver 60 comprises a receiving means 61, which is arranged for receiving an uplink radio signal, which to a part comprises a training sequence. The receiving means 61 is connected to a processor 62, which is arranged for evaluating a training sequence section of the received signal e.g. for determining a value of a signal property measure. The processor 62 could for instance also be utilised for channel estimation purposes. The receiving means 61 is also connected to another processor 63, which is arranged for evaluating a section of the received signal not comprising the training sequence, for determining another value of the same signal property measure as the processor 62. The processors 62, 63 are typically interconnected, allowing e.g. processor 63 to use a channel estimate obtained in processor 62 e.g. for equalisation purposes. The processors 62, 63 are connected to a co-sequence interference detector 64, which compares the signal property measures from the processors 62, 63 in order to determine if co-sequence interference is present in the received signal. The co-sequence interference detector 64 is preferably arranged to perform the detection according to the methods described above. An interference handling section 65 is connected to the co-sequence interference detector 64, and if any co-sequence interference is detected, the interference handling section 65 may take suitable measures to eliminate the actual interference or mitigate the effects of the interference. The units 62-65 are here described as separate units, but anyone skilled in the art realises that they advantageously can be combined in e.g. a common processor 66. The connections between the units then become logical connections instead of physical ones.

Figure 5:
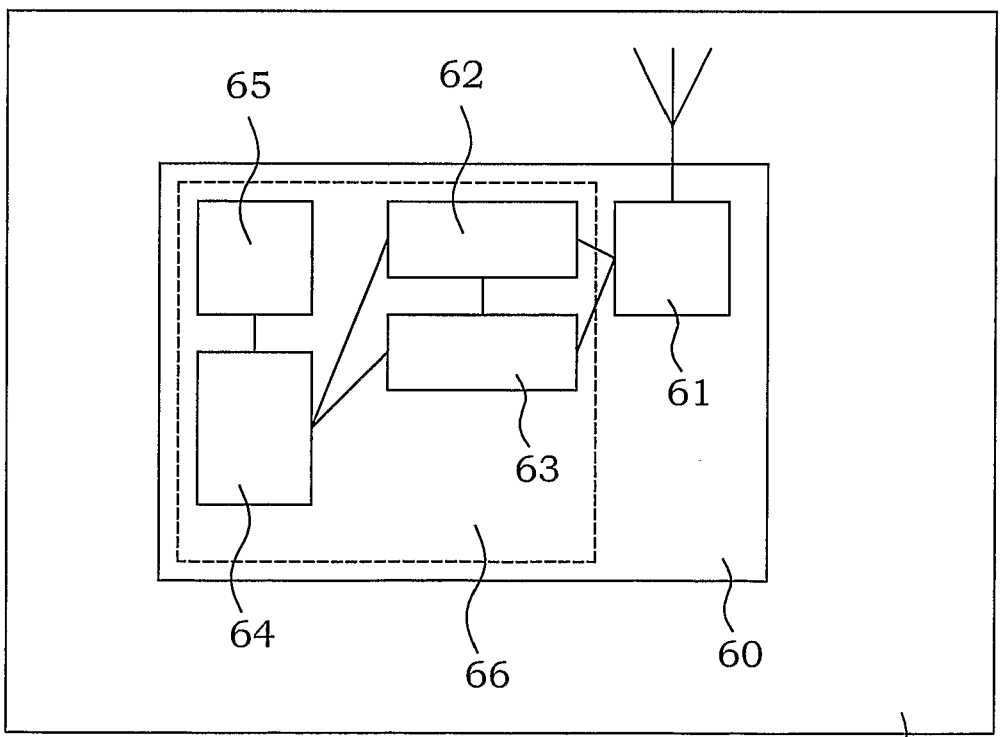
FIG. 5 is a block diagram of an embodiment of a mobile station according to the present invention.

The receiver according to the present invention may also be on the mobile side of a radio communication. In FIG. 5, an embodiment of a mobile station 40 according to the present invention is illustrated as a block scheme. Also here, the receiving means 61, the evaluation processors 62, 63, the detector 64 and the handling section 65 are present, and operates in a corresponding manner, but now on downlink signals.

Once the presence of co-sequence interference has been detected, a number of actions may be taken to compensate it or to mitigate its effect in various situations. For example, improved interference cancellation concepts may be employed, in order to reject, suppress or cancel the actual interference signal. Other concepts reducing the interference influence, e.g. during channel estimation can also be employed. Furthermore, link quality estimation methods and fixed multibeam antenna beam selection algorithms may also be designed, as well as procedures to change the used training sequence for subsequent bursts. A number of examples of such actions will be described below.

One action to take, when the existence of co-sequence interference is detected, is to make efforts for avoiding such interference in the future. An immediate measure could be to change the used training sequence as fast as possible. If a base station detects co-sequence interference, it can initiate a change of training sequence in the communication with the mobile station in question. If the base station is not by itself allowed to carry through such change, it may send a request to other network nodes. If the mobile station detects the co-sequence interference, it may send a message to the base station, informing about the interference problem. This message could for instance be included in a radio channel measurement report. By a change of training sequence, the interference will probably disappear.

In an alternative method, the request for a change could be directed to a general request for a change of radio resources. For instance, a mobile station being situated far from its own base station is generally more exposed to co-channel interference and consequently also to co-sequence interference. By making a change in allocation of the radio resource used, a channel less exposed for interference may be available.

Figure 6:
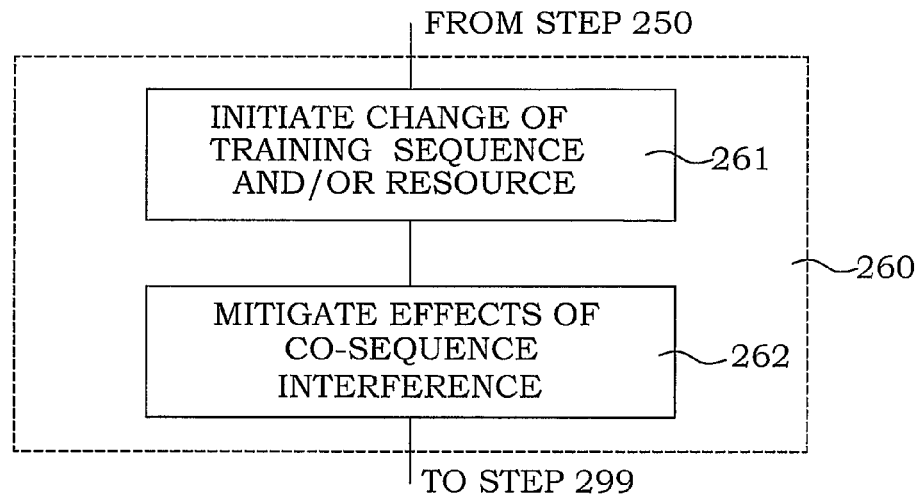
FIG. 6 is a part flow diagram illustrating a detailed embodiment of step 260 of FIG. 3.

FIG. 6a illustrates a flow diagram, specifying the step 260 of FIG. 3 in an embodiment according to the above ideas. In step 261, a change of training sequence and/or radio resource is initiated. In step 262, temporary mitigation of co-sequence interference effects is performed. In alternative embodiments, either of the steps 261 and 262 can be performed separately.

Immediate actions may also be performed, either for continuously mitigate the effects of the interference, or for helping the communication to preserve as good quality as possible until a change of training sequence or radio resource can be accomplished.

In many systems, different concepts of link adaptation are used. Transmission power, modulation or coding schemes may be adapted, depending on the quality of the received signals, to give the most appropriate transmission conditions. The adaptation is typically made by the transmitter side based on feed-back information from the receiver regarding measurements of noise and interference characteristics, such as SNR. In most cases, such measurements are performed during the training sequence. If co-sequence interference is present, the measured SNR will appear to be higher than it really is. This can then lead to that a totally inappropriate modulation and coding scheme is selected, which in turn may lead to quality degradation. In a first approach, if co-sequence interference is detected, link adaptation procedures may be temporarily inactivated, preserving the latest used modulation and coding schemes before the co-sequence interference was detected. If the detected interference is possible to remove rather quickly, the quality or efficiency loss is probably quite moderate, if any at all.

Figure 7:
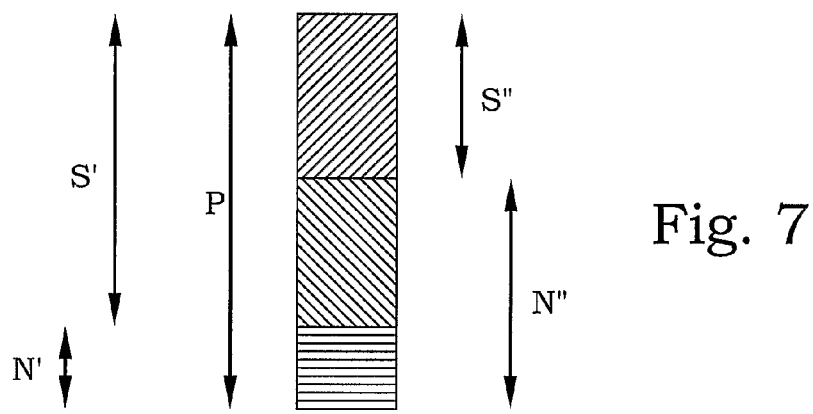
FIG. 7 is a schematic illustration of apparent and real signal to noise relations under influence of co-sequence interference.

In a more elaborate compensation procedure, link adaptation can still be performed, but with modified results from the receiver. In FIG. 7, power distribution in a co-sequence interference situation is illustrated. A total power P is measured. Moreover, a SNR is determined using the training sequence section, giving a value of S'/N'. However, by the above detection of co-sequence interference, it is concluded that a fraction q of the apparent signal S' in fact results from an interference signal. An estimate of the true SNR value can then be calculated as:

$$SNR=S''/N''=(1-q)S'/(N'+qS').$$

Link adaptation routines can then be provided by this compensated value, for providing suitable modulation and coding schemes.

Figure 8:
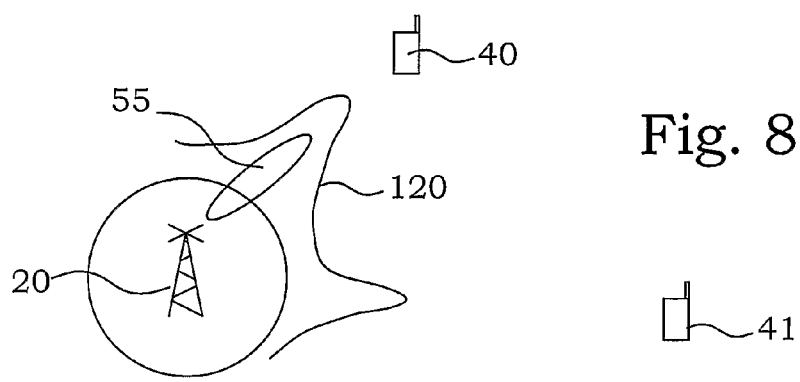
FIG. 8 is a schematic illustration of an example of SNR angular distribution experienced under influence of co-sequence interference.

When using fixed multibeam adaptive antennas, an analogous situation occurs. When adapting which beam of the antenna to use, i.e. the direction of the emitted signal, power angle distribution and SNR measurements of incident signals are made. The beam selection in the fixed beam antenna is to emit mainly in the direction of the angle having the highest power and/or best SNR. These angle distribution measurements are typically performed during the training sequence using the channel estimate, in order to easily extracting the true signal from interference and noise so that correct SNR measurements can be made. The measurements are furthermore typically time-averaged to counteract statistical contributions. However, when co-sequence interference exists, it will be difficult to distinguish the desired signal from the interfering signal, resulting in incorrect SNR measurements. FIG. 8 illustrates a situation when a mobile station 40 and a strong co-sequence interferer 41 are present. A measured SNR angle distribution 120 shows two peaks. Depending on the computational method for determining the peak angle for adapting the used beam 55 of a fixed beam antenna 20, the result may be incorrect. If, for instance, the peak position is defined as the angle of the centre of mass of the measured distribution, an angle for the fixed beam antenna would be given between the two peaks in FIG. 8, which may lead to that the entire communication is lost.

In a solution according to an embodiment of the present invention, the measurements for supporting fixed multibeam adaptive antennas are neglected if an existence of co-sequence interference is determined. The time averaging is thus not influenced by any co-sequence interference and the beam selection is continuously made according to previous data as long as the interference is present.

Interference rejection algorithms, e.g. Interference Rejection Combining (IRC) rely heavily on accurate estimation of interferers. If there is a co-channel interferer, the interference will be incorrectly estimated and the suppression algorithms may do more harm than good due to the use of false assumptions. It may then be better to resort to more simple algorithms without interference suppression, e.g. Maximum Ratio Combining (MRC). See e.g. J. Karlsson, J. Heinegård, "Interference Rejection Combining for GSM", Proc. of the 5th IEEE International Conference on Universal Personal Communications, 1996, Vol. 1, pp. 433-437 or D. Bladsjö, A. Furuskär, S. Jäverbring, E. Larsson, "Interference Cancellation using Antenna Diversity for EDGE—Enhanced Data Rates in GSM and TDMA/136", Proc. of the 50th IEEE Vehicular Technology Conference, fall 1999, Vol. 4, pp. 1956-1960.

Even if several procedures that depends on measurements during the training sequence may be possible to correct, to postpone or to omit, the main disadvantage of the existence of co-sequence interference is that the channel estimation is affected. According to one aspect of the invention, there are methods for mitigating also effects on the channel estimation.

In a first visualising example, a special case of flat fading (i.e. no time dispersion), negligible channel variation during a burst, a single co-sequence interfering signal, negligible noise, and Binary Phase Shift Keying (BPSK) modulation for both the desired and interfering signal, is assumed.

One may then express a general received signal as:

$$r(t)=c_1 \cdot s_1(t)+c_2 \cdot s_2(t)$$

where t is a time index, r(t) is the received signal, $c_1$ and $c_2$ are the time-independent channel responses of the desired and interfering signals, respectively, and $s_1(t)$ and $s_2(t)$ are the transmitted desired and interfering signals, respectively. Since BPSK modulation is employed, $s_1(t)$ and $s_2(t)$ only takes the values +1 or −1.

Now assume that $t_{TS}$ is a time instance in the training sequence part of the burst and $t_d$ is a time instance during the data part. Since the training sequences are assumed to be the same $s(t_{TS})$, one finds that:

$$r(t_{TS})=(c_1+c_2) \cdot s(t_{TS})=c \cdot s(t_{TS})=\pm c$$

Since both the received signal and the training sequence are known, one may uniquely determine the sum of the channel responses.

Further, from the first equation and the fact that the transmitted symbols are always +1 or −1, we find that it generally holds that:

$$r(t_d)=c_1 \cdot (\pm 1)+c_2 \cdot (\pm 1),$$

where any combination of "+" and "−" may occur. The four possible combinations will be:

$$r(s'=1,s''=1)=c_1+c_2=c$$

$$r(s'=1,s''=-1)=c_1-c_2$$

$$r(s'=-1,s''=1)=-c_1+c_2$$

$$r(s'=-1,s''=-1)=-c_1-c_2=-c$$

Since the sum of $c_1$ and $c_2$ is known, one can easily determine whether both symbols are +1 (in which case r equals C, $+c_2$), both symbols are −1 (in which case r equals $-(c_1+c_2)$), or if the symbols are different. In any of the first two cases, the symbols are uniquely determined and no further processing of these symbols is needed. In the last case, it is possible to determine which symbol, +1 or −1, that was received with the larger power. The stronger one is +1 if the received signal is closer in distance on a complex plane to $c_1+c_2$ than to $-(c_1+c_2)$, and vice versa. One may thus e.g. determine the value of the symbol from the desired user by assuming that the desired user has the stronger signal, i.e. assuming that the absolute value of $c_1$ is larger than that of $c_2$. Alternatively, one may use cyclic-redundancy-check (CRC) code to determine which channel that belongs to the desired user and the interfering user, respectively, as described further below.

Since many combinations of received signals generally can be used for calculating the channel responses, statistical treatment can be performed, which will reduce the influence of any noise.

The time-independent channels of the desired and interfering signals are then known, and the channel of the desired signal can then easily be applied in the equalization stage. It is thus seen that the channel estimation and detection obtained only from the training sequence signal section can be refined by analysing signal portions outside the training sequence (and vice versa) and by assuming there is co-sequence interference present.

It is also possible to perform a joint detection and estimation procedure by assuming the presence of co-sequence interference. An example is given here below using per-survivor channel tracking. The per-survivor channel tracking as such is, however, known in prior art.

Let $c_1(n)$ and $c_2(n)$ denote the channel responses of the desired and the interfering signal, respectively, and let $L_1$ and $L_2$ denote their corresponding lengths. Also, let $s_1(n)$ and $s_2(n)$ denote the transmitted symbols of the desired and interfering signal, respectively. At each stage n of the trellis of a joint detection equalizer, there are a total of $M_1^{L_1-1} \times M_2^{L_2-1}$ states, where $M_1$ and $M_2$ denotes the number of constellation points for the desired and interfering signal, respectively. $M_i=2$ for Gaussian Minimum Shift Keying (GMSK) and $M_i=8$ for 8-Phase Shift Keying (8PSK), which are the modulation schemes employed in e.g. GSM/EDGE. Each of these states may be expressed as:

$$s(n)=(s_1(n),s_2(n)),$$

where $$s_1(n)=(s_1(n),s_1(n-1),\ldots,s_1(n-L_1+2))$$

and $$s_2(n)=(s_2(n),s_2(n-1),\ldots,s_2(n-L_2+2)).$$

Each trellis state $(s_1(n),s_2(n))$ has $M_1 \times M_2$ incoming branches or transitions from the previous stage of the trellis.

When the channel responses $c_1(n)$ and $c_2(n)$ are known, a hypothesized received signal $\hat{r}$ may be computed for each state transition as:

$$\hat{r}(n, s(n), s(n-1)) = \sum_{k=0}^{L_1-1} c_1(k)s_1(n-k) + \sum_{k=0}^{L_2-1} c_2(k)s_2(n-k).$$

Associated with each state transition is a branch metric, denoted by $dM(n,s(n),s(n-1))$, which is a measure of "closeness" between the received signal $r(n)$ and the corresponding hypothesized signal $\hat{r}(n,s(n),s(n-1))$ for that state transition. For example, a common measure of closeness is the Euclidean distance given by:

$$dM(n,s(n),s(n-1))=|r(n)-\hat{r}(n,s(n),s(n-1))|^2.$$

At each stage of the trellis, only one transition into every state is kept as a survivor, namely the transition that has the lowest accumulated metric given by:

$$M(n, s(n)) = \min_{s(n-1)} \{M(n-1, s(n-1)) + dM(n, s(n), s(n-1))\},$$

where $M(n-1,s(n-1))$ denotes the lowest accumulated metric of the trellis state $s(n-1)$ at the previous stage $(n-1)$.

When a certain transmitted symbol of the desired or interfering signal is known at time n, it is possible to incorporate this known information into the trellis by adding a large bias to the branch metrics $dM(n,s(n),s(n-1))$ of the corresponding "incorrect" state transitions. This would force the trellis algorithm to choose only among the correct paths that correspond to the transmitted symbol.

When the channel responses $c_1(n)$ and $c_2(n)$ are not known, they can be estimated or tracked during trellis equalization in a manner described below, which as such is well-known to those skilled in the art, see e.g. Haykin, *Adaptive Filter Theory*, $3^{rd}$ edition, Prentice Hall, N.J., U.S.A., 1996, pages 365-438. Starting with certain initial channel estimates $c_1^{(0)}(n)$ and $c_2^{(0)}(n)$, the channel estimates at stage n can be updated using the well-known least-mean-square (LMS) algorithm for each branch as follows:

$$c_i^{(n+1)} \equiv \begin{pmatrix} c_i^{(n+1)}(0) \\ c_i^{(n+1)}(1) \\ \vdots \\ c_i^{(n+1)}(L_i-1) \end{pmatrix} = c_i^{(n)} + \mu S_i(n)^H e(n),$$

where $$e(n) \equiv r(n) - \sum_{k=0}^{L_1-1} c_1^{(n)}(k)s_1(n-k) - \sum_{k=0}^{L_2-1} c_2^{(n)}(k)s_2(n-k)$$

and where $S_i(n) \equiv [s_i(n),s_i(n-1),\ldots,s(n-L_i+1)]$ and $\mu$ denotes the step size of the tracking algorithm. The step size is a design parameter that controls the trade-off between the rate of convergence and the quality of the converged estimates. Alternatively, the channel estimates can also be updated using the recursive least squares (RLS) algorithm, see e.g. Haykin, *Adaptive Filter Theory*, $3^{rd}$ edition, Prentice Hall, N.J., U.S.A., 1996, pages 562-587, which is computationally more complex and is also as such well-known to those skilled in the art.

The channel estimation calculations according to the above scheme based on two independent, unknown signals are typically quite computationally demanding, and the resulting channel estimates may not be very accurate. However, if co-sequence interference is known to be present, known relations during the training sequence can be used to apply additional constrictions in the trellis transition through the addition of bias mentioned above. It is for instance known that the signals $s_1$ and $S_2$ are identical during the training sequence, if a sufficient time-alignment is present. Alternatively, initial channel estimates obtained over the training sequence according to any conventional estimation method will give a channel response c, being the sum of the channel responses $c_1$ and $c_2$. Such relations may be used to reduce the computational complexity of the above scheme and/or to improve the overall accuracy.

The procedures described above produce two channel estimates, namely $c_1(n)$ and $c_2(n)$. However, it may not be immediately clear to the receiver whether $c_1(n)$ or $c_2(n)$ corresponds to the channel of the desired signal. One simple method to resolve this uncertainty is to assign the channel estimate with the largest energy (or squared norm) to be the channel estimate of the desired signal. This method assumes that the signal power from the desired transmitter should be larger than those from the interfering transmitters. An alternative method to resolve this uncertainty is to use the content stored inside each demodulated bit sequence, such as the parity check code or the CRC check code commonly embedded in the transmitted bit sequence. For example, the receiver may use each of the two demodulated bit sequences, which corresponds to $c_1(n)$ and $c_2(n)$, respectively, in channel coding. The channel estimate corresponding to the demodulated bit sequence that passes the parity check code or CRC check code during channel decoding is selected as the channel estimate of the desired signal.

Figure 9:
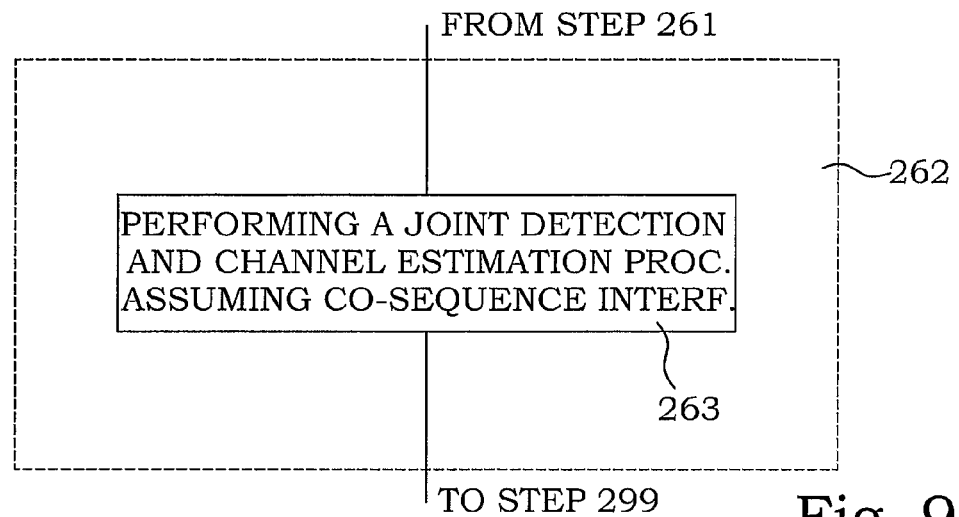
FIG. 9 is a flow diagram of the main steps of a detailed embodiment of step 262 of FIG. 6.

In FIG. 9, the main steps of an embodiment of a channel estimation method according to the present invention are illustrated as a flow diagram. The method can be applied as step 262 of FIG. 6. In step 263, a joint detection and channel estimation procedure is performed assuming presence of co-sequence interference. The channel estimation and detection may in one embodiment be performed on both the first and second signal sections, whereby a difference in appearing channel responses between the signal sections is interpreted as the desired and interfering signals having different values. In another embodiment the joint detection and channel estimation procedure comprises per-survivor channel tracking. The presence of co-sequence interference in the first signal section can thereby be used to form additional constraints that are imposed to the channel tracking. The additional constraints can for instance be introduced as bias to branch metrics.

Figure 10:
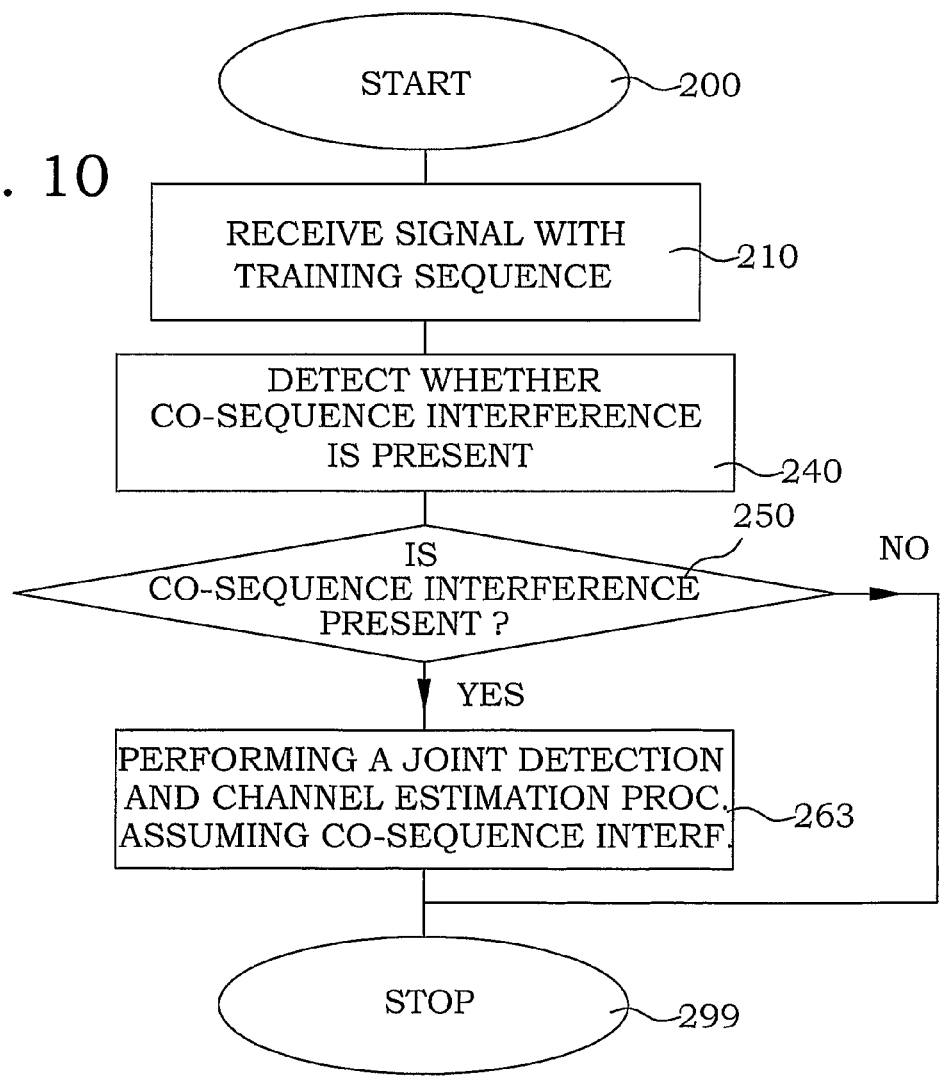
FIG. 10 is a flow diagram of the main steps of an embodiment of another method according to the present invention.

The channel estimation method described above can also be applied together with any co-sequence interference detection method. Main steps of an embodiment of such a method is illustrated in FIG. 10. The procedure starts in step 200. In step 210 a signal is received, which comprises both training sequence and other data. A detection of the existence of co-sequence interference, if any, is performed in step 240. In step 250, it is checked if co-sequence interference is detected in step 240, and if it is, the procedure continues with step 263, otherwise the procedure is ended in step 299. In step 263, a joint detection and channel estimation procedure is performed assuming the presence of co-sequence interference. The procedure ends in step 299.

In the embodiments described above, the detection and/or mitigation of co-sequence interference is performed in systems involving radio signals possible to interfere with each other. However, the methods can also be utilised in any system transmitting signals that use training sequences. Non-exclusive examples are signals transmitted over cable or fibre.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

REFERENCES

Published International Patent Application WO 98/59443.
Published U.S. Patent Application 2003/0026223.
J. Karlsson, J. Heinegård, "Interference Rejection Combining for GSM", Proc. of the 5th IEEE International Conference on Universal Personal Communications, 1996, Vol. 1, pp. 433-437.
D. Bladsjö, A. Furuskär, S. Jäverbring, E. Larsson, "Interference Cancellation using Antenna Diversity for EDGE—Enhanced Data Rates in GSM and TDMA/136", Proc. of the 50th IEEE Vehicular Technology Conference, fall 1999, Vol. 4, pp. 1956-1960.
Haykin, *Adaptive Filter Theory*, 3$^{rd}$ edition, Prentice Hall, N.J., U.S.A., 1996, pp. 365-438, 562-587.

The invention claimed is:

1. A method in a communication system, comprising the steps of:
   receiving a signal comprising a first training signal section including a training sequence and a second payload data signal section;
   evaluating at least a part of the first training signal section for determining a first value of a signal property measure of the first training signal section;
   evaluating at least a part of the second payload data signal section for determining a second value for the signal property measure of the second payload data signal section;
   comparing the first and second values to determine a difference; and
   detecting an existence of co-sequence interference in the signal if an absolute value of the difference exceeds a predetermined threshold value.

2. Method according to claim 1, wherein the signal property measure is a signal-to-noise ratio estimate.

3. Method according to claim 1, wherein the signal property measure is a measure of signal statistics.

4. Method according to claim 3, wherein the signal property measure is an autocorrelation function.

5. Method according to claim 1, further comprising a step of initiating a change of training sequence and/or radio resource.

6. Method according to claim 1, further comprising a step of mitigating effects of co-sequence interference in the signal.

7. Method according to claim 6, wherein the step of mitigating comprises the step of excluding the signal from being used in procedures using time averaging of signals.

8. Method according to claim 7, wherein the procedures using time averaging of signals comprise beam selection procedures in fixed multibeam adaptive antennas.

9. Method according to claim 6, wherein the step of mitigating comprises the step of refraining to use the signal in procedures using signal power measures.

10. Method according to claim 9, wherein the procedures using signal power measures comprise link adaptation procedures.

11. Method according to claim 6, further comprising a step of:
   performing a joint detection and channel estimation procedure assuming the presence of co-sequence interference.

12. Method according to claim 11, comprising the further step of:
   identifying a channel response for the desired signal from two or more estimated channel responses.

13. Method according to claim 11, wherein a channel estimation and detection procedure is performed on both the first and second signal sections, whereby a difference in appearing channel responses between the signal sections is interpreted as the desired and interfering signals having different values.

14. Method according to claim 11, wherein the step of performing a joint detection and channel estimation procedure comprises per-survivor channel tracking, whereby additional constraints are imposed by assuming the presence of co-sequence interference.

15. Method according to claim 14, wherein the additional constraints are introduced as bias to branch metrics.

16. Method according to claim 1, further comprising a step of refraining from employing co-channel interference cancellation if co-sequence interference is determined to exist.

17. Method according to claim 1, wherein the signal is a radio signal.

18. Method according to claim 1, wherein the signal is a signal received over cable or fibre.

19. A method in a communication system, comprising the steps of:
   receiving a signal comprising a first signal section involving a training sequence and a second signal section;
   evaluating at least a part of the first signal section for determining a first value of a signal property measure of the first signal section;

evaluating at least a part of the second signal section for determining a second value for the signal property measure of the second signal section; and detecting an existence of co-sequence interference in the signal based on a comparison between the first and second values, wherein existence of co-sequence interference is detected if a ratio between an absolute value of a difference between the first and second values, and the first value, is larger than a predetermined third value.

20. A method in a communication system, comprising the steps of:

receiving a signal comprising a first signal section involving a training sequence and a second signal section;

evaluating at least a part of the first signal section for determining a first value of a signal property measure of the first signal section;

evaluating at least a part of the second signal section for determining a second value for the signal property measure of the second signal section;

detecting an existence of co-sequence interference in the signal based on a comparison between the first and second values; and determining a signal power ratio between true signal and co-sequence interference for the signal in the first signal section, and compensating apparent signal power of the first signal section using the determined signal power ratio to mitigate effects of co-sequence interference in the signal.

21. A receiver device, comprising:

a receiver configured to receive a signal including a first training signal section involving a training sequence and a second payload data signal section;

a signal processor configured to evaluate:

evaluate at least a part of the first training signal section for determining a first value of a signal property measure of the first training signal section;

evaluate at least a part of the second payload data signal section for determining a second value for the signal property measure of the second payload data signal section;

compare the first and second values to determine a difference; and detect an existence of co-sequence interference in the signal if an absolute value of the difference exceeds a predetermined threshold value.

22. Receiver device according to claim 21, wherein the signal processor is configured to initiate a change of training sequence and/or radio resource.

23. Receiver device according to claim 21, wherein the signal processor is configured to mitigate effects of co-sequence interference in the signal.

24. A mobile terminal comprising a receiver device, said receiver device comprising:

a receiver configured to receive a signal comprising a first training signal section involving a training sequence and a second payload data signal section;

a signal processor configured to:

evaluate at least a part of the first training signal section for determining a first value of a signal property measure of the first training signal section;

evaluate at least a part of the second payload data signal section for determining a second value for the signal property measure of the second payload data signal section;

compare the first and second values to determine a difference; and detect an existence of co-sequence interference in the signal if an absolute value of the difference exceeds a predetermined threshold value.

25. A base station in a mobile communications system comprising a receiver device, said receiver device comprising:

receiver means for a signal comprising a first training signal section involving a training sequence, and a second payload data signal section;

means for evaluating at least a part of the first training signal section for determining a first value of a signal property measure of the first training signal section;

means for evaluating at least a part of the second payload data signal section for determining a second value for the signal property measure of the second payload data signal section;

means for comparing the first and second values to determine a difference; and means for detecting an existence of co-sequence interference in the signal if an absolute value of the difference exceeds a predetermined threshold value.

* * * * *

UNITED STATES PATENT AND TRADEMARK OFFICE
CERTIFICATE OF CORRECTION

PATENT NO. : 8,023,938 B2
APPLICATION NO. : 11/628460
DATED : September 20, 2011
INVENTOR(S) : Axnas et al.

It is certified that error appears in the above-identified patent and that said Letters Patent is hereby corrected as shown below:

In Column 10, Lines 38-39, delete "$C,+c_2$)," and insert -- $c_1+c_2$), --, therefor.

In Column 12, Line 17, delete "$s(n-L_i+1)$]" and insert -- $s_i(n-L_i+1)$] --, therefor.

Signed and Sealed this
Fourteenth Day of February, 2012

David J. Kappos
*Director of the United States Patent and Trademark Office*